United States Patent [19]

Wilhelm

[11] 4,083,806

[45] Apr. 11, 1978

[54] HYDROCARBON CONVERSION WITH AN ACIDIC, SULFUR-FREE TRIMETALLIC CATALYTIC COMPOSITE

[75] Inventor: Frederick C. Wilhelm, Ann Arbor, Mich.

[73] Assignee: Universal Oil Products Company, Des Plaines, Ill.

[21] Appl. No.: 697,075

[22] Filed: Jun. 17, 1976

Related U.S. Application Data

[60] Division of Ser. No. 538,827, Jan. 6, 1975, Pat. No. 3,972,805, and a continuation-in-part of Ser. No. 343,743, Mar. 22, 1973, abandoned, and a continuation-in-part of Ser. No. 15,960, Mar. 2, 1970, abandoned.

[51] Int. Cl.$^2$ .................. B01J 27/10; B01J 27/08
[52] U.S. Cl. .................................. 252/442; 252/441; 208/139
[58] Field of Search .................. 252/441, 442, 466 B

[56] References Cited

U.S. PATENT DOCUMENTS

| | | | |
|---|---|---|---|
| 3,227,658 | 1/1966 | Myers et al. | 252/442 X |
| 3,271,325 | 9/1966 | Davies et al. | 252/466 B |
| 3,562,346 | 2/1971 | Smirnov et al. | 252/472 X |
| 3,630,961 | 12/1971 | Wilhelm | 252/442 X |
| 3,632,525 | 1/1972 | Rausch | 252/442 |
| 3,660,309 | 5/1972 | Hayes et al. | 252/442 |
| 3,686,340 | 8/1972 | Patrick et al. | 252/466 PT |

*Primary Examiner*—Patrick P. Garvin

*Attorney, Agent, or Firm*—James R. Hoatson, Jr.; Thomas K. McBride; William H. Page, II

[57] ABSTRACT

Hydrocarbons are converted by contacting them in a substantially sulfur-free environment at hydrocarbon conversion conditions with an acidic, sulfur-free trimetallic catalytic composite comprising a combination of catalytically effective amounts of a platinum group component, a tin or lead component, a nickel component and a halogen component with a porous carrier material. The platinum group component, tin or lead component, nickel component, and halogen component are present in the trimetallic catalyst in amounts respectively, calculated on an elemental basis, corresponding to about 0.01 to about 2 wt. % platinum group metal, about 0.01 to about 5 wt. % tin or lead, about 0.01 to about 5 wt. % nickel, and about 0.1 to about 3.5 wt. % halogen. Moreover, these metallic components are uniformly dispersed throughout the porous carrier material in carefully controlled oxidation states such that substantially all of the platinum group metal is present therein in the elemental metallic state, the major portion of the nickel component is present in the elemental metallic state, while substantially all of the tin or lead is present therein in an oxidation state above that of the elemental metal. A specific example of the type of hydrocarbon conversion process disclosed is a process for the catalytic reforming of a low-octane gasoline fraction wherein the gasoline fraction and a hydrogen stream are contacted in a substantially sulfur-free environment with the acidic, sulfur-free trimetallic catalyst disclosed herein at reforming conditions.

8 Claims, No Drawings

HYDROCARBON CONVERSION WITH AN ACIDIC, SULFUR-FREE TRIMETALLIC CATALYTIC COMPOSITE

CROSS-REFERENCE TO RELATED APPLICATIONS

This application is a division of prior application Ser. No. 538,827, filed Jan. 6, 1975, and now U.S. Pat. No. 3,972,805, which, in turn, is a continuation-in-part of my prior, now abandoned Application Ser. No. 343,743 filed Mar. 22, 1973, which in turn is a continuation-in-part of my prior, now abandoned, Application Ser. No. 15,960 filed Mar. 2, 1970. Said application 538,827 issued Aug. 3, 1976, as U.S. Pat. No. 3,972,805. A related application is my prior Application Ser. No. 241,417 filed Apr. 5, 1972 and now U.S. Pat. No. 3,796,654 issued Mar. 12, 1974, all of the teachings of these prior applications are specifically incorporated herein by reference.

The subject of the present invention is a novel acidic, sulfur-free trimetallic catalytic composite which has exceptional activity and resistance to deactivation when employed in a hydrocarbon conversion process that requires a catalyst having both a hydrogenation-dehydrogenation function and a cracking function. More precisely, the present invention involves a novel dual-function catalytic composite which, quite surprisingly, enables substantial improvements in hydrocarbon conversion processes that have traditionally used a dual-function catalyst. In another aspect, the present invention comprehends the improved processes that are produced by the use of an acidic, sulfur-free trimetallic catalytic composite comprising a combination of catalytically effective amounts of a platinum group component, a nickel component, a tin or lead component and a halogen component with a porous carrier material specifically, an improved reforming process which utilizes the subject catalyst to improve activity, selectivity and stability characteristics.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as the metals or compounds of metals of Groups V and VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffins is contacted with a dual-function catalyst to produce an output stream rich in isoparaffins.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used — that is, the temperature, pressure, contact time, and presence of diluents such as $H_2$; (2) selectivity refers to the amount of desired product or products obtained relative to the amount of reactants charged or converted; (3) stability refers to the rate of change with time of the activity and selectivity parameters — obviously, the smaller rate implying the more stable catalyst. In a reforming process, for example, activity commonly refers to the amount of conversion that takes place for a given charge stock at a specified severity level and is typically measured by octane number of the $C_5+$ product stream; selectivity refers to the amount of $C_5+$ yield that is obtained at the particular severity level relative to the amount of the charge; and stability is typically equated to the rate of change with time of activity, as measured by octane number of $C_5+$ product, and of selectivity, as measured by $C_5+$ yield. Actually, the last statement is not strictly correct because generally a continuous reforming process is run to produce a constant octane $C_5+$ product with severity level being continuously adjusted to attain this result; and, furthermore, the severity level is for this process usually varied by adjusting the conversion temperature in the reaction zone so that, in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words the performance of this dual-function catalyst is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of the formation of these carbonaceous materials on the catalyst. Viewed in terms of performance parameters, the problems is to develop a dual-function catalyst having superior activity, selectivity and stability. In particular, for a reforming process the problem is typically expressed in terms of shifting and stabilizing the $C_5+$ yield-octane relationship at the lowest possible severity level — $C_5+$ yield being representative of selectivity and octane being proportional to activity.

I have now found a dual-function acidic, sulfur-free trimetallic catalytic composite which possesses improved activity, selectivity, and stability when it is employed in a process for the conversion of hydrocarbons of the type which have heretofore utilized dual-function catalytic composites such as processes for isomerization, hydroisomerization, dehydrogenation, desulfurization, denitrogenization, hydrogenation, alkylation, dealkylation, hydrodealkylation, transalkylation, cyclization, dehydrocyclization, cracking, hydrocracking, reforming, and the like processes. In particular, I have found that an acidic, sulfur-free catalytic composite comprising a combination of catalytically effective amounts of a platinum group component, a nickel component, a tin or lead component and a halogen component with a porous refractory carrier material can enable the performance of hydrocarbon conversion processes utilizing dual-function catalysts to be substantially improved if the catalytic composite is prepared, maintained and used in a substantially sulfur-free environment if the metallic components are uniformly dispersed throughout the porous carrier material and if the oxidation states of the metal moieties are adjusted so that substantially all of the platinum group metal is in the elemental state, substantially all of the tin or lead is in a positive oxidation state and the major portion of the nickel is in the elemental state. Moreover, I have determined that an acidic, sulfur-free trimetallic catalytic composite, comprising a combination of catalytically effective amounts of a platinum group component, a tin or lead component, a nickel component, and a halogen component with an alumina carrier material, can be utilized to substantially improve the performance of a reforming process which operates on a gasoline fraction to produce a high-octane reformate if the composite is prepared, maintained and used in a substantially sulfur-free environment, if the metal moieties are properly dispersed in the carrier and if their oxidation states are controlled as hereinafter specified. In the case of a reforming process, the principal advantage associated with the use of the novel acidic, sulfur-free trimetallic catalyst of the present invention involves the acquisition of the capability to operate in a stable manner in a high severity operation; for example, a low pressure reforming process designed to produce a $C_5+$ reformate having an octane of about 100 F-1 clear. As indicated, the present invention essentially involves the finding that the addition of specified amounts of a tin or lead component and a nickel component to an acidic dual-function hydrocarbon conversion catalyst containing a platinum group component enables the performance characteristics of the catalyst to be sharply and materially improved if the composite is maintained substantially free of sulfur.

It is, accordingly, one object of the present invention to provide an acidic, sulfur-free trimetallic hydrocarbon conversion catalyst having superior performance characteristics when utilized in a hydrocarbon conversion process. A second object is to provide a catalyst having dual-function hydrocarbon conversion performance characteristics that are relatively insensitive to the deposition of hydrocarbonaceous material thereon. A third object is to provide preferred methods of preparation of this trimetallic catalytic composite which insures the achievement and maintenance of its properties. Another object is to provide an improved trimetallic reforming catalyst having superior activity, selectivity and stability. Yet another object is to provide a dual-function and sulfur-free hydrocarbon conversion catalyst which utilizes a combination of a tin or lead component and a nickel component to promote an acidic catalyst containing a platinum group metal.

In brief summary, the present invention is, in one embodiment, an acidic, sulfur-free catalytic composite comprising a porous carrier material containing, on an elemental basis, about 0.01 to about 2 wt. % platinum group metal, about 0.01 to 5 wt. % nickel, about 0.01 to about 5 wt. % tin or lead and about 0.1 to about 3.5 wt. % halogen, wherein the platinum group metal, nickel and tin or lead are uniformly dispersed throughout the porous carrier material, wherein substantially all of the platinum group metal is present in the elemental metallic state, wherein substantially all of the tin or lead is present in an oxidation state above that of the elemental metal, and wherein the major portion of the nickel is present in the elemental metallic state.

A second embodiment relates to an acidic, sulfur-free catalytic composite comprising an alumina carrier material containing, on an elemental basis, about 0.05 to about 1 wt. % platinum group metal, about 0.05 to about 2 wt. % nickel, about 0.05 to about 2 wt. % tin or lead and about 0.5 to about 1.5 wt. % halogen, wherein the platinum group metal, nickel and tin or lead are uniformly dispersed throughout the alumina carrier material, wherein substantially all of the platinum group metal is present in the elemental metallic state, wherein substantially all of the tin or lead is present in an oxidation state above that of the elemental metal, and wherein the major portion of the nickel is present in the elemental metallic state.

Another embodiment relates to a process for the conversion of a hydrocarbon comprising contacting the hydrocarbon and hydrogen in a substantially sulfur-free environment with the catalytic composite described above in the first or second embodiment at hydrocarbon conversion conditions.

A preferred embodiment relates to a process for reforming a gasoline fraction which comprises contacting the gasoline fraction and hydrogen in a substantially sulfur-free environment with the catalytic composite described above in the first or second embodiment at reforming conditions selected to produce a high-octane reformate.

Other objects and embodiments of the present invention relate to additional details regarding preferred catalytic ingredients, preferred amounts of ingredients, suitable methods of composite preparation, operating conditions for use in the hydrocarbon conversion processes, and the like particulars which are hereinafter given in the following detailed discussion of each of these facets of the present invention. It is to be noted that the expression "uniform dispersion of a component in a carrier material" is intended to describe the situation when the amount of the component in the carrier material is approximately the same in any divisible portion thereof.

The acidic, sulfur-free trimetallic catalyst of the present invention comprises a porous carrier material or support having combined therewith catalytically effective amounts of a platinum group component, a nickel component, a tin or lead component and a halogen component.

Considering first the porous carrier material utilized in the present invention, it is preferred that the material be a porous adsorptive, high-surface area support having a surface area of about 25 to about 500 m$^2$/g. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke or charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica magnesia, chromia-alumina, alumina-boria, silica-zirconia, etc.; (5) crystalline zeolitic aluminosilicates such as naturally occurring or synthetically prepared mordenite and/or faujasite, either in the hydrogen form or in a form which has been treated with multivalent cations; and (6) combination of elements from one or more of these groups. The preferred porous carrier materials for use in the present invention are refractory inorganic oxides, with best results obtained with an alumina carrier material. Suitable alumina materials are the crystalline aluminas known as the gamma-, eta-, and theta-aluminas, with gamma-alumina giving best results. In addition, in some embodiments, the alumina carrier material may contain minor proportions of other well known refractory inorganic oxides such as silica, zirconia, magnesia, etc.; however, the preferred support is substantially pure gamma-alumina. Preferred carrier materials have an apparent bulk density of about 0.3 to about 0.7 g/cc and surface area characteristics such that the average pore diameter is about 20 to 300 Angstroms, the pore volume is about 0.1 to about 1 cc/g and the surface area is about 100 to about 500 m$^2$/g. In general, excellent results are typically obtained with a gamma-alumina carrier material which is used in the form of spherical particles having: a relatively small diameter (i.e., typically about 1/16 inch), an apparent bulk density of about 0.5 g/cc, a pore volume of about 0.4 cc/g, and a surface area of about 175 m$^2$/g.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent such as ammonium hydroxide to a solution of a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention a particularly preferred form of alumina is the sphere; and alumina spheres may be continuously manufactured by the well-known oil drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the instant catalytic composite is the tin or lead component. It is an essential feature of the present invention that substantially all of the tin or lead component is present in the final catalyst in an oxidation state above that of the elemental metal. This component may be present in the catalytic composite in chemical combination with one or more of the other ingredients of the composite, or as a chemical compound of tin or lead such as the corresponding oxide, halide, oxyhalide, oxychloride, aluminate, and the like compounds. Based on the evidence currently available, it is believed that best results are obtained when substantially all of the tin or lead component exists in the final composite as tin oxide or lead oxide, respectively, and the subsequently described oxidation and reduction steps, that are used in the preparation of the instant composite, are believed to result in a trimetallic catalytic composite which contains tin oxide or lead oxide. This component can be utilized in the composite in any amount which is catalytically effective, with the preferred amount being about 0.01 to about 5 wt. % thereof, calculated on an elemental basis. The exact amount selected within this broad range is preferably determined as a function of the particular metal that is utilized. For instance, in the case where this component is lead, it is preferred to select the amount of this component from the low end of this range — namely, about 0.01 to about 1 wt. %. Additionally, it is preferred to select the amount of lead as a function of the amount of the platinum group component as explained hereinafter. In the case where this component is tin, it is preferred to select from a relatively broader range of about 0.05 to about 2 wt. % thereof.

This tin or lead component may be incorporated in the composite in any suitable manner known to the art to result in a uniform dispersion of the metal moiety throughout the carrier material such as by coprecipitation or cogellation with the porous carrier material, ion exchange with the carrier material, or impregnation of the carrier material at any stage in its preparation. It is to be noted that it is intended to include within the scope of the present invention all conventional procedures for incorporating a metallic component in a catalytic composite, and the particular method of incorporation used is not deemed to be an essential feature of the present invention so long as the tin or lead component is relatively uniformly distributed throughout the porous carrier material. One acceptable method of incorporating the tin or lead component into the catalytic composite involves cogelling the tin or lead component during the preparation of the preferred carrier material, alumina. This method typically involves the addition of a suitable soluble compound of tin or lead to the alumina hydrosol. The resulting mixture is then commingled with a suitable gelling agent, such as a relatively weak alkaline reagent, and the resulting mixture is thereafter preferably gelled by dropping into a hot oil bath as explained hereinbefore. After aging, drying and calcining the resulting particles there is obtained an intimate combination of the oxide of tin or lead and alumina. One preferred method of incorporating this component into the composite involves utilization of a soluble, decomposable compound of tin or lead to impregnate the porous carrier material either before, during or after the carrier material is calcined. In general, the solvent using during this impregnation step is selected on the basis of its capability to dissolve the desired tin or lead compound without affecting the porous carrier material which is to be impregnated; ordinarily, good results are obtained when water is the solvent; thus the preferred tin or lead compounds for use in this impregnation step are typically water-soluble and decomposable. Examples of suitable tin or lead compounds are: stannous bromide, stannous chloride, stannic chloride, stannic chloride diamine, stannic trichloride bromide, stannic chromate, stannous fluoride, stannic iodide, stannic tartrate, lead acetate, lead bromate, lead bromide, lead chlorate, lead chloride, lead citrate, lead formate, lead lactate, lead malate, lead nitrate, lead nitrite, lead dithionate, and the like compounds. In the case of tin, stannic or stannous chloride dissolved in water is preferred. And in the case of lead, lead nitrate in water is preferred. Regardless of which impregnation solution is utilized, the tin or lead component can be impregnated either prior to, simultaneously with, or after the other metallic components are added to the carrier material. Ordinarily, best results are obtained when this component is impregnated simultaneously with the other metallic components of the composite. Likewise, best results are ordinarily obtained when the tin or lead component is tin.

Regardless of which tin or lead compound is used in the preferred impregnation step, it is important that the metal moiety be uniformly distributed throughout the carrier material. In order to achieve this objective it is necessary to maintain the ph of the impregnation solution in a range of about 7 to about 1 or less and to dilute the impregnation solution to a volume which is approximately the same or greater than the void volume of the carrier material which is impregnated. Similarly, it is preferred to use a relatively long contact time during the impregnation step ranging from about ¼ hour up to about ½ hour or more before drying to remove excess solvent in order to insure a high dispersion of the tin or lead component in the porous carrier material. The carrier material is, likewise, preferably constantly agitated during this preferred impregnation step.

A second essential ingredient of the subject catalyst is the platinum group component. Although the process of the present invention is specifically directed to the use of a catalytic composite containing platinum, it is intended to include other platinum group metals such as palladium, rhodium, ruthenium, osmium, and iridium and mixtures thereof. It is an essential feature of the instant catalyst that substantially all of the platinum group component is present in the final catalyst as the elemental metal. Generally, the amount of the platinum group component present in the final catalyst composite is small compared to the quantities of the other components combined therewith. In fact, the platinum group component generally comprises about 0.01 to about 2 wt. % of the final catalytic composite, calculated on an elemental basis. Excellent results are obtained when the catalyst contains about 0.05 to about 1 wt. % of the platinum group metal. The preferred platinum group component is platinum, although good results are obtained when it is palladium or iridium or rhodium. Excellent results are obtained when this component is a mixture of these metals such as platinum and iridium, platinum and rhodium, and the like.

The platinum group component may be incorporated in the catalytic composite in any suitable manner known to result in a uniform dispersion of the platinum group metal throughout the carrier material such as coprecipitation or cogellation, ion-exchange, or impregnation. The preferred method of preparing the catalyst involves the utilization of a soluble, decomposable compound of a platinum group metal to impregnate the carrier material. Thus, the platinum group component may be added to the support by commingling the latter with an aqueous solution of chloroplatinic acid. Other water-soluble compounds of platinum group metals may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, palladium chloride, palladium nitrate, chloropalladic acid, chloroiridic acid, rhodium chloride hydrate, etc. The utilization of a platinum group metal chloride compound, such as chloroplatinic acid is preferred since it facilitates the incorporation of both the platinum group component and at least a minor quantity of the halogen component in a single step. Hydrogen chloride or the like acid is also generally added to the impregnation solution in order to further facilitate the incorporation of the halogen component and the distribution of the metallic component. In addition, it is generally preferred to impregnate the carrier material after it has been calcined in order to minimize the risk of washing away the valuable platinum group metal compounds; however, in some cases it may be advantageous to impregnate the carrier material when it is in a gelled state.

Yet another essential ingredient of the present catalytic composite is a nickel component. It is an essential feature of the present invention that a major portion of this component is present in the final composite in the elemental state. In other words, it is essential that 50% or more of the nickel be in the elemental state and preferably at least 60% to 90% or more. Best results are believed to be obtained when the composite contains substantially all this component in the elemental metallic state, and the subsequently described oxidation and reduction steps which are preferably performed in preparing the present composite is believed to result in this condition. The nickel component may be utilized in the composite in any amount which is catalytically effective, with the preferred amount being about 0.01 to about 5 wt. % thereof, calculated on an elemental nickel basis. Typically, best results are obtained with about 0.05 to about 2 wt. % nickel. It is, additionally, preferred to select the specific amount of nickel from within this broad weight range as a function of the amount of the platinum group metal component, on an atomic basis, as is explained hereinafter.

The nickel component may be incorporated into the catalytic composite in any suitable manner known to those skilled in the catalyst formulation art to result in a uniform dispersion of the metal moiety throughout the carrier material. In addition, it may be added at any stage of the preparation of the composite — either during preparation of the carrier material or thereafter — since the precise method of incorporation used in not deemed to be critical so long as the required uniform dispersion is obtained. One acceptable procedure for incorporating this component into the composite involves cogelling the nickel component during the preparation of the preferred carrier material, alumina. This procedure usually comprehends the addition of a soluble, decomposable compound of nickel such as nickel chloride to the alumina hydrosol before it is gelled. The resulting mixture is then finished by conventional gelling, aging, drying and calcination steps are explained hereinbefore. One preferred way of incorporating this component is an impregnation step wherein the porous carrier material is impregnated with a suitable nickel-containing solution either before, during or after the carrier material is calcined. Preferred impregnation solutions are aqueous solutions of water-soluble, decomposable nickel compounds such as nickel bromate, nickel bromide, nickel perchlorate, nickel chloride, nickel fluoride, nickel iodide, nickel nitrate, nickel formate, nickel hexammine, nickel (II) chloride or bromide or nitrate, and the like compounds. Best results are ordinarily obtained when the impregnation solution is an aqueous solution of nickel chloride or nickel nitrate. This nickel component can be added to the carrier material, either prior to, simultaneously with, or after the other metallic components are combined therewith. Best results are usually achieved when this component is added simultaneously with the other metallic components. In fact, excellent results have been obtained, as reported in the examples, with a one-step impregnation procedure using an aqueous solution comprising chloroplatinic acid, nickel chloride, hydrochloric acid and tin chloride or lead nitrate.

Yet another essential ingredient of the instant acidic, sulfur-free trimetallic catalytic composite is a halogen component. Although the precise form of the chemistry of the association of the halogen component with the carrier material is not entirely known, it is customary in the art to refer to the halogen component as being combined with the carrier material, or with the other ingredients of the catalyst in the form of the corresponding halide — for example, as the chloride. This combined halogen may be either fluorine, chlorine, iodine, bromine or mixtures thereof. Of these, fluorine, and particularly chlorine, are preferred for the purposes of the present invention. The halogen may be added to the carrier material in any suitable manner either during preparation of the support or before or after the addition of the other components. For example, the halogen may be added at any stage of the preparation of the carrier material or to the calcined carrier material, as an aqueous solution of a suitable halogen-containing compound such as hydrogen fluoride, hydrogen chloride, hydrogen bromide, ammonium chloride, etc. The halogen component or a portion thereof may be combined with the carrier material during the impregnation of the latter with the platinum group metal component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen will be typically combined with the carrier material in an amount sufficient to result in a final composite that contains about 0.1 to about 3.5 wt. % and preferably about 0.5 to about 1.5 wt. % of halogen calculated on an elemental basis. In isomerization or hydrocracking embodiments, it is generally preferred to utilize relatively larger amounts of halogen in the catalyst — typically ranging up to about 10 wt. % halogen calculated on an elemental basis, and more preferably about 1 to about 5 wt. %.

Regarding the preferred amounts of the various metallic components of the subject catalyst, I have found it to be a good practice to specify the amounts of the nickel component and of the tin or lead component as a function of the amount of the platinum group component. On this basis, the amount of the nickel component is ordinarily selected so that the atomic ratio of nickel to the platinum group metal contained in the composite is about 0.2:1 to about 20:1, with the preferred range being about 1:1 to 10:1. Similarly, the amount of the tin or lead component is ordinarily selected to produce a composite containing an atomic ratio of tin or lead metal to platinum group metal within the broad range of about 0.05:1 to 10:1. The best practice is to select this ratio on the basis of the following preferred range for the individual species: (1) for tin, it is about 0.1:1 to 3:1, with the most preferred range being about 0.5:1 to 1.5:1; and (2) for lead, it is about 0.05:1 to 0.9:1, with the most preferred range being about 0.1:1 to 0.75:1.

Another significant parameter for the instant catalyst is the "total metals content" which is defined to be the sum of the platinum group component, the nickel component and the tin or lead component, calculated on an elemental metal basis. Good results are ordinarily obtained with the subject catalyst when this parameter is fixed at a value of about 0.15 to about 5 wt. %, with best results ordinarily achieved at a metals loading of about 0.3 to about 2 wt. %.

Integrating the above discussion of each of the essential and preferred ingredients of the trimetallic catalytic composite, it is evident that a particularly preferred catalytic composite for reforming comprises a combination of a platinum group component, a nickel component, a tin component and a chloride component with an alumina carrier material in amounts sufficient to result in the composite containing about 0.5 to about 1.5 wt. % chloride, about 0.05 to about 1 wt. % platinum, about 0.05 to about 2 wt. % nickel and about 0.05 to about 2 wt. % tin.

Regardless of the details of how the components of the catalyst are combined with the porous carrier material, the final catalyst generally will be dried at a temperature of about 200° to about 600° F. for a period of from about 2 to about 24 hours or more, and finally calcined or oxidized at a temperature of about 700° F. to about 1100° F. in an air or oxygen atmosphere for a period of about 0.5 to about 10 hours in order to convert substantially all of the metallic components to the corresponding oxide form. Best results are generally obtained when the halogen content of the catalyst is adjusted during this calcination or oxidation step by including water and a halogen or a halogen-containing compound in the air or oxgyen atmosphere utilized. In particular, when the halogen component of the catalyst is chlorine, it is preferred to use a mole ratio of $H_2O$ to HCl or equivalent of about 20:1 to about 100:1 during at least a portion of the calcination step in order to adjust the final chlorine content of the catalyst to a range of about 0.5 to about 1.5 wt. %.

It is another essential feature of my invention that the resultant calcined catalytic composite is subject to a substantially water-free reduction step prior to its use in the conversion of hydrocarbons. This step is designed to insure a uniform and finely divided dispersion of the metallic components throughout the carrier material. Preferably, substantially pure and dry hydrogen (i.e., less than 20 vol. ppm. $H_2O$) is used as the reducing agent in this step. The reducing agent is contacted with the calcined catalyst at a temperature of about 800° F. to about 1200° F. and for a period of time of about 0.5 to 10 hours or more effective to substantially reduce: (1) substantially all of the platinum group component to the elemental state, and (2) the major portion of the nickel component to the corresponding elemental state, while maintaining substantially all of the tin or lead component in a positive oxidation state. This reduction treatment may be performed in situ as part of a start-up sequence if precautions are taken to predry the plant to a substantially water-free state and if substantially water-free hydrogen is used.

The resulting reduced catalytic composite is, in accordance with the basic concept of the present invention, maintained in a sulfur-free state both during its preparation and thereafter during its use in the conversion of hydrocarbons. As indicated previously, the beneficial interaction of the nickel component with the other ingredients of the present catalytic composite is contingent upon the maintenance of the nickel moiety in a highly dispersed, readily reducible state in the carrier material. Sulfur in the form of sulfide adversely interfers with both the dispersion and reducibility of the nickel component and consequently it is a highly preferred practice to avoid presulfiding the reduced acidic trimetallic catalyst resulting from the reduction step. Once the catalyst has been exposed to hydrocarbon for a sufficient period of time to lay down a protective layer of carbon or coke on the surface thereof, the sulfur sensitivity of the resulting carbon-containing composite changes rather markedly and the presence of small amounts of sulfur can be tolerated without permanently disabling the catalyst. The exposure of the freshly reduced catalyst to sulfur can seriously damage the nickel component thereof and consequently jeopardize the superior performance characteristics associated therewith. However, once a protective layer of carbon is established on the catalyst, the sulfur deactivation effect is less permanent and sulfur can be purged therefrom by exposure to a sulfur-free hydrogen stream at a temperature of about 800° to 1100° F.

According to the present invention, a hydrocarbon charge stock and hydrogen are contacted with the instant acidic sulfur-free trimetallic catalyst in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well-known operational advantages, it is preferred to use either a fixed bed system or a dense-phase moving bed system such as is shown in U.S. Pat. No. 3,725,249. In a fixed bed system, a hydrogen-rich gas and the charge stock are preheated by any suitable heating means to the desired reaction temperature and then are passed into a conversion zone containing a fixed bed of the acidic trimetallic catalyst. It is, of course, understood that the conversion zone may be one or more separate reactors with suitable means therebetween to insure that the desired conversion temperature is maintained at the entrance to each reactor. It is also important to note that the reactants may be contacted with the catalyst bed in either upward, downward or radial flow fashion with the latter being preferred. In addition, the reactants may be in the liquid phase, a mixed liquid-vapor phase, or a vapor phase when they contact the catalyst, with best results obtained in the vapor phase.

In the case where the acidic, sulfur-free trimetallic catalyst of the present invention is used in a reforming operation, the reforming system will typically comprise a reforming zone containing one or more fixed beds or dense-phase moving beds of the catalyst. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in some cases aromatics and/or olefins may also be present. This preferred class includes straight run gasolines, natural gasolines, synthetic gasolines and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° to about 150° F. and an end boiling point within the range of from about 325° to about 425° F., or may be a selected fraction thereof which generally will be a higher boiling fraction commonly referred to as a heavy naphtha — for example, a naphtha boiling in the range of $C_7$ to 400° F. In some cases, it is also advantageous to charge pure hydrocarbons or mixtures of hydrocarbons that have been extracted from hydrocarbon distillates — for example, straight-chain paraffins — which are to be converted to aromatics. It is preferred that these charges stocks be treated by conventional catalytic pretreatment methods such as hydrorefining, hydrotreating, hydrodesulfurization, etc., to remove substantially all sulfurous, nitrogenous and water-yielding contaminants therefrom and to saturate any olefins that may be contained therein.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins, or a normal butane-rich stock or a n-hexane-rich stock, or a mixture of xylene isomers, etc. In a dehydrogenation embodiment, the charge stock can be any of the known dehydrogenatable hydrocarbons such as an aliphatic compound containing 2 to 30 carbon atoms per molecular, a $C_4$ to $C_{30}$ normal paraffin, a $C_8$ to $C_{12}$ alkylaromatic, a naphthene and the like. In hydrocracking embodiments, the charge stock will be typically a gas oil, heavy cracked cycle oil, etc. In addition, alkylaromatic and naphthenes can be conveniently isomerized by using the catalyst of the present invention. Likewise, pure hydrocarbons or substantially pure hydrocarbons can be converted to more valuable products by using the acidic trimetallic catalyst of the present invention in any of the hydrocarbon conversion processes, known to the art, that use a dual-function catalyst.

Since sulfur has a high affinity for nickel at hydrocarbon conversion conditions, best results are achieved in the conversion of hydrocarbons with the instant acidic, sulfur-free trimetallic catalytic composite when the catalyst is used in a substantially sulfur-free environment. This is particularly true in the catalytic reforming embodiment of the present invention. The expression "substantially sulfur-free environment" is intended to mean that the total amount (expressed as equivalent elemental sulfur) of sulfur or sulfur-containing compounds, which are capable of producing a metallic sulfide at the reaction conditions used, entering the reaction zone containing the instant catalyst from any source is continuously maintained at an amount equivalent to less than 10 wt. ppm of the hydrocarbon charge stock, more preferably less than 5 wt. ppm, and most preferably less than 1 wt. ppm. Since in the ordinary operation of a conventional catalytic reforming process, wherein influent hydrogen is autogenously produced, the prime source for any sulfur entering the reforming zone is the hydrocarbon charge stock, maintaining the charge stock substantially free of sulfur is ordinarily sufficient to ensure that the environment containing the catalyst is maintained in the substantially sulfur-free state. More specifically, since hydrogen is a by-product of the catalytic reforming process, ordinarily the input hydrogen stream required for the process is obtained by recycling a portion of the hydrogen-rich stream recovered from the effluent withdrawn from the reforming zone. In this typical situation, this recycle hydrogen stream will ordinarily be substantially free of sulfur if the charge stock is maintained free of sulfur. If autogenous hydrogen is not utilized, then, of course, the concept of the present invention requires that the input hydrogen stream be maintained substantially sulfur-free; that is, less than 10 vol. ppm of $H_2S$, preferably less than 5 vol. ppm, and most preferably less than 1 vol. ppm.

The only other possible sources of sulfur that could interfere with the performance of the instant catalyst are sulfur that is initially combined with the catalyst and/or with the plant hardware. As indicated hereinbefore, a crucial feature of the present acidic, sulfur-free trimetallic catalyst is that it is maintained substantially sulfur-free; therefore, sulfur released from the catalyst is not usually a problem in the present process. Hardware sulfur is ordinarily not present in a new plant; it only becomes a problem when the present process is to be implemented in a plant that has seen service with a sulfur-containing feedstream. In this latter case, the preferred practice of the present invention involves an initial pre-treatment of the sulfur-containing plant in order to remove substantially all of the decomposable hardware sulfur therefrom. This can be easily accomplished by any of the techniques for stripping sulfur from hardware known to those in the art; for example, by the circulation of a substantially sulfur-free hydrogen stream through the internals of the plant at a relatively high temperature of about 800° to about 1200° F. until the $H_2S$ content of the effluent gas stream drops to a relatively low level — typically, less than 5 vol. ppm and preferably less than 2 vol ppm. In sum, the preferred sulfur-free feature of the present invention requires that the total amount of detrimental sulfur entering the hydrocarbon conversion zone containing the hereinbefore described catalyst must be continuously maintained at a substantially low level; specifically, the amount of sulfur must be held to a level equivalent to less than 10 wt. ppm, and preferably less than 1 wt. ppm, of the feed.

In the case where the sulfur content of the feed stream for the present process is greater than the amounts previously specified, it is, of course, necessary to treat the charge stock in order to remove the undesired sulfur contaminants therefrom. This is easily accomplished by using any one of the conventional catalytic pre-treatment methods such as hydrorefining, hydrotreating, hydrodesulfurization, and the like to remove substantially all sulfurous, nitrogenous and water-yielding contaminants from this feedstream. Ordinarily, this involves subjecting the sulfur-containing feedstream to contact with a suitable sulfur-resistant hydrorefining catalyst in the presence of hydrogen under conversion conditions selected to decompose sulfur contaminants contained therein and form hydrogen sulfide. The hydrorefining catalyst typically comprises one or more of the oxides or sulfides of the transition metals of groups VI and VIII of the Periodic Table. A particularly preferred hydrorefining catalyst comprises a combination of a metalic component from the iron group metals of Group VIII and of a metallic component of the Group VI transition metals combined with a suitable porous refractory support. Particularly good results have been obtained when the iron group component is cobalt and/or nickel and the Group VI transition metal is molybdenum or tungsten. The preferred support for this type of catalyst is a refractory inorganic oxide of the type previously mentioned. For example, good results are obtained with a hydrorefining catalyst comprising cobalt oxide and molybdenum oxide supported on a carrier material comprising alumina and silica. The conditions utilized in this hydrorefining step are ordinarily selected from the following ranges: a temperature of about 600° to about 950° F., a pressure of about 500 to about 5000 psig., a liquid hourly space velocity of about 1 to about 20 hr.$^{-1}$, and a hydrogen circulation rate of about 500 to about 10,000 standard cubic feet of hydrogen per barrel of charge. After this hydrorefining step, the hydrogen sulfide, ammonia and water liberated therein, are then easily removed from the resulting purified charge stock by conventional means such as a suitable stripping operation. Specific hydrorefining conditions are selected from the ranges given above as a function of the amounts and kinds of the sulfur contaminants in the feedstream in order to produce a substantially sulfur-free charge stock which is then charged to the process of the present invention.

In a reforming embodiment, it is generally preferred to utilize the novel acidic, sulfur-free trimetallic catalytic composite in a substantially water-free environment. Essential to the achievement of this condition in the reforming zone is the control of the water level present in the charge stock and the hydrogen stream which is being charged to the zone. Best results are ordinarily obtained when the total amount of water entering the conversion zone from any source is held to a level less than 20 ppm and preferably less than 5 ppm expressed as weight of equivalent water in the charge stock. In general, this can be accomplished by careful control of the water present in the charge stock and in the hydrogen stream. The charge stock can be dried by using any suitable drying means known to the art, such as conventional solid adsorbent having a high selectivity for water, for instance, sodium or calcium crystalline aluminosilicates, silica gel, activated alumina, molecular sieves, anhydrous calcium sulfate, high surface area sodium and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. In an especially preferred mode of operation, the charge stock is dried to a level corresponding to less than 5 wt. ppm of $H_2O$ equivalent. In general, it is preferred to maintain the hydrogen stream entering the hydrocarbon conversion zone at a level of about 10 vol. ppm of water or less and most preferably about 5 vol. ppm or less. If the water level in the hydrogen stream is too high, drying of same can be conveniently accomplished by contacting the hydrogen stream with a suitable desiccant such as those mentioned above.

In the reforming embodiment, an effluent stream is withdrawn from the reforming zone and passed through a cooling means to a separation zone, typically maintained at about 25° to 150° F., wherein a hydrogen-rich gas stream is separated from a high octane liquid product stream, commonly called an unstabilized reformate. When the water level in the hydrogen stream is outside the range previously specified, at least a portion of this hydrogen-rich gas stream is withdrawn from the separating zone and passed through an adsorption zone containing an adsorbent selective for water. The resultant substantially water-free hydrogen stream can then be recycled through suitable compressing means back to the reforming zone. The liquid phase from the separating zone is typically withdrawn and commonly treated in a fractionating system in order to adjust the butane concentration, thereby controlling front-end volatility of the resulting reformate.

The conditions utilized in the numerous hydrocarbon conversion embodiments of the present invention are in general those customarily used in the art for the particular reaction, or combination of reactions, that is to be effected. For instance, alkylaromatic and paraffin isomerization conditions include: a temperature of about 32° F to about 1000° F. and preferably from about 75° to about 600° F.; a pressure of atmospheric to about 100 atmospheres; a hydrogen to hydrocarbon mole ratio of about 0.5:1 to about 20:1 and an LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$. Dehydrogenation conditions include: a temperature of about 700° to about 1250° F., a pressure of about 0.1 to about 10 atmospheres, a liquid hourly space velocity of about 1 to 40 hr.$^{-1}$ and a hydrogen to hydrocarbon mole ratio of about 1:1 to 20:1. Likewise, typically hydrocracking conditions include: a pressure of about 500 psig. to about 3000 psig, a temperature of about 400° F. to about 900° F., an LHSV of about 0.1 hr.$^{-1}$ to about 10 hr.$^{-1}$, and hydrogen circulation rates of about 1000 to 10,000 SCF per barrel of charge.

In the reforming embodiment of the present invention, the pressure utilized is selected from the range of about 0 psig. to about 1000 psig., with the preferred pressure being about 50 psig. to about 600 psig. Particularly good results are obtained at low or moderate pressure; namely, a pressure of about 100 to 450 psig. In fact, it is a singular advantage of the present invention that it allows stable operation at lower pressure than have heretofore been successfully utilized in so-called "continuous" reforming systems (i.e. reforming for periods of about 15 to about 200 or more barrels of charge per pound of catalyst without regeneration) with an all platinum monometallic catalyst. In other words, the acidic trimetallic catalyst of the present invention allows the operation of a continuous reforming system to be conducted at lower pressure (i.e 100 to about 350 psig.) for about the same or better catalyst cycle life before regeneration as has been heretofore realized with conventional monometallic catalysts at higher pressure (i.e. 400 to 600 psig.). On the other hand, the extraordinary activity and activity-stability characteristics of the catalyst of the present invention enables reforming conditions conducted at pressures of 400 to 600 psig. to achieve substantially increased catalyst cycle life before regeneration.

The temperature required for reforming with the instant catalyst is markedly lower than that required for a similar reforming operation using a high quality catalyst of the prior art. This significant and desirable feature of the present invention is a consequence of the extraordinary activity of the acidic, sulfur-free trimetallic catalyst of the present invention for the octane-upgrading reactions that are preferably induced in a typical reforming operation. Hence, the present invention requires a temperature in the range of from about 800° F. to about 1100° F. and preferably about 900° F. to about 1050° F. As is well known to those skilled in the continuous reforming art, the initial selection of the temperature within this broad range is made primarily as a function of the desired octane of the product reformate considering the characteristics of the charge stock and the catalyst. Ordinarily, the temperature then is thereafter slowly increased during the run to compensate for the inevitable deactivation that occurs to provide a constant octane product. Therefore, it is a feature of the present invention that not only is the initial temperature requirement substantially lower but also the rate at which the temperature is increased in order to maintain a constant octane product is substantially lower for the catalyst of the present invention than for an equivalent operation with a high quality reforming catalyst which is manufactured in exactly the same manner as the catalyst of the present invention except for the inclusion of the nickel and tin or lead components. Moreover, for the catalyst of the present invention, the $C_5+$ yield loss for a given temperature increase is substantially lower than for a high quality reforming catalyst of the prior art. The extraordinary activity of the instant catalyst can be utilized in a number of highly beneficial ways to enable increased performance of a catalytic reforming process relative to that obtained in a similar operation with a monometallic or bimetallic catalyst of the prior art, some of these are: (1) Octane number of $C_5+$ product can be substantially increased without sacrificing catalyst run length. (2) The duration of the process operation before regeneration becomes necessary, can be significantly increased (i.e. catalyst run length or cycle life). (3) $C_5+$ yield can be increased by lowering the average reactor pressure with no change in catalyst run length. (4) Investment costs can be lowered without any sacrifice in cycle life by lowering recycle gas requirements thereby saving on capital cost for compressor capacity or by lowering initial catalyst loading requirements thereby saving on cost of catalyst and on capital cost of the reactors. (5) Throughput can be increased sharply at no sacrifice in catalyst cycle life if sufficient heater capacity is available.

The reforming embodiment of the present invention also typically utilizes sufficient hydrogen to provide an amount of about 1 to about 20 moles of hydrogen per mole of hydrocarbon entering the reforming zone, with excellent results being obtained when about 2 to about 6 moles of hydrogen are used per mole of hydrocarbon. Likewise, the liquid hourly space velocity (LHSV) used in reforming is selected from the range of about 0.1 to about 10hr.$^{-1}$, with a value in the range of about 1 to about 5 hr.$^{-1}$ being preferred. In fact, it is a feature of the present invention that it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory or at greatly increased throughput level with the same catalyst inventory than that heretofore used with conventional reforming catalysts at no sacrifice in catalyst life before regeneration.

The following examples are given to illustrate further the preparation of the acidic, sulfur-free trimetallic catalytic composite of the present invention and the use thereof in the conversion of hydrocarbons. It is understood that the examples are intended to be illustrative rather than restrictive.

EXAMPLE I

This example demonstrates a particularly good method of preparing the acidic, sulfur-free platinum-tin-nickel trimetallic catalytic composite of the present invention.

A sulfur-free alumina carrier material comprising 1/16 inch spheres was prepared by: forming an aluminun hydroxyl chloride sol by dissolving substantially pure aluminum pellets in a hydrochloric acid solution, adding hexamethylenetetramine to the resulting sol, gelling the resulting solution by dropping it into an oil bath to form spherical particles of an aluminum hydrogel, aging and washing the resulting particles and finally drying and calcining the aged and washed particles to form spherical particles of gamma-alumina containing about 0.3 wt. % combined chloride. Additional details as to this method of preparing the preferred carrier material are given in the teachings of U.S. Pat. No. 2,620,314.

An aqueous sulfur-free impregnation solution containing chloroplatinic acid, nickel chloride, stannic chloride and hydrogen chloride was then prepared and used to impregnate the gamma-alumina particles in amounts, respectively, calculated to result in a final composite containing, on an elemental basis, 0.5 wt. % Sn, 0.5 wt. % Ni and 0.375 wt. % Pt. In order to insure uniform distribution of the metallic components throughout the carrier material, this impregnation step was performed by adding the carrier material particles to the impregnation mixture with constant agitation. In addition, the volume of the solution was approximately the same as the void volume of the carrier material particles. The impregnation mixture was maintained in contact with the carrier material particles for a period of about ½ hour at a temperature of about 70° F. Thereafter, the temperature of the impregnation mixture was raised to about 225° F. and the excess solution was evaporated in a period of about 1 hour. The resulting dried particles were then subjected to a calcination treatment in an air atmosphere at a temperature of about 925° F. for about 1 hour. The calcined spheres were then contacted with an air stream containing $H_2O$ and HCl in a mole ratio of about 40:1 for about 4 hours at 975° F. in order to adjust the halogen content of the catalyst particles to a value of about 0.9.

The resulting substantially sulfur-free trimetallic catalyst particles were analyzed and found to contain, on an elemental basis, about 0.375 wt. % platinum, about 0.5 wt. % tin, about 0.5 wt % nickel and about 1.02 wt. % chloride. The atomic ratio of nickel to platinum was approximately 4.4:1. Likewise, the atomic ratio of tin to platinum was 2.2:1.

Thereafter, the catalyst particles were subjected for one hour to a dry pre-reduction treatment by contacting them with a substantially pure hydrogen stream containing less than 20 vol. ppm $H_2O$ at a temperature of about 1000° F., a pressure slightly above atmospheric and a flow rate of the hydrogen stream through the catalyst particles corresponding to a gas hourly space velocity of about 720 hr.$^{-1}$ effective to reduce substantially all of the platinum component to platinum metal and the major portion of the nickel component to nickel metal, while maintaining substantially all of the tin component in a positive oxidation state.

EXAMPLE II

An acidic, sulfur-free platinum-lead-nickel trimetallic catalyst was then prepared according to the procedure given in Example I except that lead nitrate was substituted for stannic chloride in the impregnation solution in an amount selected to result in a finished catalyst containing 0.1 wt. % lead and that nitric acid was substituted for hydrochloric acid.

The resulting catalyst contained 0.375 wt. % platinum, 0.1 wt. % lead, 0.5 wt. % nickel and 0.95 wt. % chloride in combination with a gamma-alumina carrier. The atomic ratio of nickel to platinum was 4.4:1 and the atomic ratio of lead to platinum was 0.25:1.

EXAMPLE III

In order to compare the novel trimetallic catalyst composites of the present invention with the corresponding bimetallic composites in a manner calculated to bring out the beneficial interaction of the nickel component with the platinum-tin and platinum-lead catalysts, a comparison test was made between the trimetallic catalysts of the present invention, prepared in Example I and II, and the corresponding platinum-tin and platinum-lead bimetallic catalysts. The first control bimetallic catalyst was a combination of 0.375 wt. % platinum, 0.5 wt. % tin and 0.97 wt. % chloride with a gamma-alumina carrier material which catalyst was prepared by a method analogous to that given in Example I except for the inclusion of the nickel component. The second bimetallic control catalyst was a combination of 0.375 wt. % platinum, 0.1 wt. % lead and 0.97 wt. % chloride with a gamma-alumina carrier material prepared by a method analogous to that given in Example II except for the inclusion of the nickel component.

These catalysts were then separately subjected to a high stress evaluation test designed to determine their relative activity, selectivity and stability for the reforming of a gasoline charge stock. In all tests the same charge stock was utilized, its characteristics are given in Table I. It is to be noted that this test is conducted under a substantially water-free condition with the only significant source of water being the 5.9 wt. ppm. present in the charge stock. In addition, the reforming environment is maintained substantially free of sulfur, with the only source of sulfur being the 0.5 wt. ppm sulfur in the feed.

TABLE I
ANALYSIS OF HEAVY KUWAIT NAPHTHA

| | |
|---|---|
| API gravity at 60° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |
| Sulfur, wt. ppm. | 0.5 |
| Nitrogen, wt. ppm. | 0.1 |
| Aromatics, vol. % | 8 |
| Paraffins, vol. % | 71 |
| Naphthenes, vol. % | 21 |
| Water, ppm. | 5.9 |
| Octane No., F-1 clear | 40.0 |

This test was specifically designed to determine in a very short time period whether the catalysts being evaluated have superior characteristics for the reforming process. The test consisted of a 6 hour lineout period followed by three 10 hour test periods run at a constant temperature of about 970° F. followed by another 6 hour test period and three 10 hour test periods at a temperature of about 1000° F. During each test period a $C_5+$ product reformate was collected, and analyzed. It was performed in a laboratory scale reforming plant comprising a reactor containing the catalyst, hydrogen separation zone, a debutanizer column, suitable heating, pumping, and condensing means, etc.

In this plant, a hydrogen recycle stream and the charge stock are commingled and heated to the desired conversion temperature. The resulting mixture is then passed downflow into a reactor containing the catalyst undergoing evaluation as a fixed bed. An effluent stream is then withdrawn from the bottom of the reactor, cooled to about 55° F. and passed to the separating zone wherein a hydrogen-rich gaseous phase separates from a liquid phase. A portion of the gaseous phase is continuously passed through a high surface area sodium scrubber and the resulting substantially water-free and sulfur-free hydrogen stream recycled to the reactor in order to supply hydrogen for the reaction, and the excess over that needed for plant pressure is recovered as excess separator gas. Moreover, the liquid phase from the separating zone is withdrawn therefrom and passed to the debutanizer column wherein light ends are taken overhead as debutanizer gas and a $C_5+$ reformate stream recovered as bottoms.

Conditions utilized in this test ae: a constant temperature of about 970° F. for the first three periods followed by a constant temperature of about 1000° F. for the last three periods, a liquid hourly space velocity of 3 hr.$^{-1}$, an outlet pressure of the reactor of 100 psig., and a mole ratio of hydrogen to hydrocarbon entering the reactor of 6:1. This two-temperature test is designed to quickly and efficiently yield two points on the yield-octane curve for the particular catalyst being studied. The conditions utilized are selected on the basis of experience to yield the maximum amount of information on the capability of the catalyst being tested to respond to a high severity operation.

The results of the separate tests performed on each of the trimetallic catalysts of the present invention and their corresponding bimetallic control catalysts are presented for each test period in Tables II and III in terms of inlet temperature to the reactor in ° F., net excess separator gas in standard cubic feet per barrel of charge (SCF/bbl), debutanizer overhead gas in SCF/bbl, the ratio of the debutanizer gas make to the total gas make, and F-1 clear octane number of the resulting $C_5+$ reformate.

TABLE II
RESULTS FOR TIN-CONTAINING CATALYSTS

| Period No. | T, ° F. | Separator Gas SCF/bbl | Debutanizer Gas SCF/bbl | Debutanizer /Total Gas Ratio | Octane No. F-1 Clear |
|---|---|---|---|---|---|
| Trimetallic catalyst - 0.375 wt. % platinum, 0.5 wt. % nickel, 0.5 wt. % tin, and 1.02 wt. % chloride. | | | | | |
| 1 | 973 | 1656 | 69 | 0.040 | 98.3 |
| 2 | 973 | 1624 | 68 | 0.040 | 98.1 |
| 3 | 973 | 1609 | 67 | 0.040 | 97.9 |
| 4 | 1007 | 1795 | 72 | 0.038 | 100.2 |
| 5 | 1007 | 1725 | 73 | 0.040 | 100.0 |
| 6 | 1007 | 1667 | 74 | 0.042 | 99.1 |
| Bimetallic catalyst - 0.375 wt. % platinum. 0.5 wt. % tin and 0.97 wt. % chloride. | | | | | |
| 1 | 973 | 1492 | 69 | 0.044 | 97.6 |
| 2 | 973 | 1452 | 71 | 0.047 | 96.5 |
| 3 | 973 | 1399 | 70 | 0.047 | 95.9 |
| 4 | 1007 | 1566 | 82 | 0.050 | 98.8 |
| 5 | 1007 | 1475 | 82 | 0.053 | 97.9 |
| 6 | 1007 | 1453 | 83 | 0.054 | 97.1 |

TABLE III
RESULTS FOR LEAD-CONTAINING CATALYSTS

| Period No. | T, ° F. | Separator Gas SCF/bbl | Debutanizer Gas SCF/bbl | Debutanizer /Total Gas Ratio | Octane No. F-1 Clear |
|---|---|---|---|---|---|
| Trimetallic catalyst - 0.375 wt. % platinum, 0.5 wt. % nickel, 0.1 wt. % lead, and 0.095 wt. % chloride. | | | | | |
| 1 | 973 | 1659 | 71 | 0.041 | 98.2 |
| 2 | 973 | 1624 | 72 | 0.042 | 98.0 |
| 3 | 973 | 1636 | 75 | 0.044 | 97.2 |
| 4 | 1007 | 1724 | 83 | 0.046 | 99.4 |
| 5 | 1007 | 1610 | 88 | 0.052 | 99.1 |
| 6 | 1007 | 1516 | 92 | 0.057 | 97.6 |
| Bimetallic control catalyst - 0.375 wt. % platinum, 0.1 wt. % lead, and 0.97 wt. % chloride. | | | | | |
| 1 | 973 | 1471 | 69 | 0.045 | 96.0 |
| 2 | 973 | 1413 | 69 | 0.047 | 94.9 |
| 3 | 973 | 1388 | 70 | 0.048 | 93.8 |
| 4 | 1007 | 1533 | 83 | 0.051 | 97.5 |
| 5 | 1007 | 1467 | 86 | 0.055 | 96.4 |
| 6 | 1007 | 1393 | 89 | 0.060 | 95.2 |

Referring now to the results given in Tables II and III of the separate tests performed on these catalysts, it is evident that the effect of the nickel component on the bimetallic catalyst is to substantially promote the platinum-tin and platinum-lead catalysts. That is, the trimetallic catalysts of the present invention are superior to the corresponding bimetallic control catalysts in both activity and selectivity. As was pointed out hereinbefore, a good measure of activity for a reforming catalyst is octane number of reformate produced at the same conditions; on this basis, the trimetallic catalysts of the present invention were more active than the corresponding control catalysts at both temperature conditions. However, activity is only half of the story: activity must be coupled with selectivity to demonstrate superiority. Selectivity is measured directly by reference to $C_5+$ yield and indirectly by reference to separator gas make, which is roughly proportional to net hydrogen make which, in turn, is a product of the preferred upgrading reactions, and by reference to debutanizer gas make which is a rough measure of undesired hydrocracking and should be minimized for a highly selective catalyst. Referring again to the data presented in Tables II and III and using the selectivity criteria, it is manifest that the trimetallic catalyst of the present invention are materially more selective than the corresponding control catalysts.

EXAMPLE IV

A tin-containing, sulfur-free alumina carrier material comprising 1/16 inch spheres was prepared by: forming an aluminum hydroxyl chloride sol by dissolving substantially pure aluminum pellets in a hydrochloric acid solution, adding stannic chloride to the resulting sol in an amount selected to result in a finished catalyst containing about 0.2 wt. % tin, adding hexamethylenetetramine to the resulting tin-containing alumina sol, gelling the resulting solution by dropping it into an oil bath to form spherical particles of an aluminum- and tin-containing hydrogel, aging and washing the resulting particles and finally drying and calcining the aged and washed particles to form spherical particles of gamma-alumina containing a uniform dispersion of about 0.2 wt. % tin in the form of tin oxide and about 0.3 wt. % combined chloride.

An aqueous sulfur-free impregnation solution containing chloroplatinic acid, nickel chloride and hydrogen chloride was then prepared. The tin-containing alumina carrier material was thereafter admixed with the impregnation solution. The amount of reagents contained in this impregnation solution was calculated to result in a final composite containing, on an elemental basis, 0.30 wt. % platinum and 0.5 wt. % nickel. In order to insure uniform dispersion of the metallic components throughout the carrier material, the amount of hydrochloric acid used was about 3 wt. % of the alumina particles. This impregnation step was performed by adding the carrier material particles to the impregnation mixture with constant agitation. In addition, the volume of the solution was approximately the same as the void volume of the carrier material particles. The impregnation mixture was maintained in contact with the carrier material particles for a period of about ½ to about 3 hours at a temperature of about 70° F. Thereafter, the temperature of the impregnation mixture was raised to about 225° F. and the excess solution was evaporated in a period of about 1 hour. The resulting dried impregnated particles were then subjected to an oxidation treatment in a dry air stream at a temperature of about 975° F. and a GHSV of about 500 hr.$^{-1}$ for about ½ hour. This oxidation step was designed to convert substantially all of the metallic ingredients to the corresponding oxide forms. The resulting oxidized spheres were subsequently contacted in a halogen treating step with an air stream containing $H_2O$ and HCl in a mole ratio of about 30:1 for about 2 hours at 975° F. and a GHSV of about 500 hr.$^{-1}$ in order to adjust the halogen content of the catalyst particles to a value of about 1.09 wt. %. The halogen-treated spheres were thereafter subjected to a second oxidation step with a dry air stream at 975° F. and a GHSV of 500 hr.$^{-1}$ for an additional period of about ½ hour.

The oxidized and halogen treated catalyst particles were then subjected to a dry pre-reduction treatment, designed to reduce the platinum component and the major portion of the nickel component to the elemental state while maintaining the tin component in positive oxidation state, by contacting it for about 1 hour with a substantially hydrocarbon-free dry hydrogen stream containing less than 5 vol. ppm $H_2O$ at a temperature of about 1050° F., a pressure slightly above atmospheric, and a flow rate of the hydrogen stream through the catalyst particles corresponding to a gas hourly space velocity of about 400 hr.$^{-1}$.

A sample of the resulting reduced catalyst particles was analyzed and found to contain, on an elemental basis, about 0.30 wt. % platinum, about 0.5 wt. % nickel, about 0.2 wt. % tin and about 0.99 wt. % chloride. This corresponds to an atomic ratio of tin to platinum of 1.1:1 and to an atomic ratio of nickel to platinum of 5.5:1. The resulting acidic, sulfur-free trimetallic catalyst is hereinafter referred to as catalyst "A".

Another sample of this catalyst was subjected to a conventional presulfiding step designed to incorporate therein 0.15 wt. % sulfur. This corresponds to a sulfur to platinum atomic ratio of 3:1. The resulting catalyst is hereinafter referred to as catalyst "B".

In order to demonstrate the advantages of using the sulfur-free composite of the present invention, a comparison test was made between the acidic, sulfur-free trimetallic catalyst of the present invention (i.e. catalyst "A") and the sulfur-containing variant thereof (i.e. catalyst "B"). These catalysts were then separately subjected to a high stress accelerated catalytic reforming evaluation test in a reforming pilot plant, similar to the one described in Example III designed to determine in a relatively short period of time their relative activity, selectivity, and stability characteristics in a process for reforming a relatively low-octane gasoline fraction. In both tests the same charge stock was utilized and its pertinent characteristics are set forth in Table IV. It is to be noted that in both cases the test was conducted under substantially water-free conditions with the only significant source of water being the 14 to 18 wt. ppm present in the charge stock. Likewise, it is to be observed that both runs were performed under substantially sulfur-free conditions with the only sulfur input into the plant being the 0.1 ppm sulfur contained in the charge stock.

TABLE IV

| Analysis of Charge Stock | |
|---|---|
| Gravity, ° API at 60° F. | 59.7 |
| Distillation Profile, ° F. | |
| Initial Boiling Point | 178 |
| 5% Boiling Point | 199 |
| 10% Boiling Point | 210 |
| 30% Boiling Point | 232 |
| 50% Boiling point | 244 |
| 70% Boiling Point | 286 |
| 90% Boiling Point | 320 |
| 95% Boiling Point | 336 |
| End Boiling Point | 376 |
| Chloride, wt. ppm. | 0.35 |
| Nitrogen, wt. ppm. | 0.2 |
| Sulfur, wt. ppm. | 0.1 |
| Water, wt. ppm. | 14–18 |
| Octane Number, F-1 Clear | 41.0 |
| Paraffins, vol. % | 67 |
| Naphthenes, vol. % | 21.2 |
| Aromatics, vol. % | 11.8 |

This accelerated reforming test was specifically designed to determine in a very short period of time whether the catalyst being evaluated has superior characteristics for use in a high severity reforming operation. Each run consisted of a series of evaluation periods of 24 hours, each of these periods comprised a 12 hour line-out period followed by a 12 hour test period during which the $C_5+$ product reformate from the plant was collected and analyzed. Both test runs were performed at identical conditions which comprised a liquid hourly space velocity (LHSV) of 3.0 hr.$^{-1}$, a pressure of 300 psig., a 10:1 gas to oil ratio, and an inlet reactor temperature which was continuously adjusted throughout the test in order to achieve and maintain a $C_5+$ target octane of 100 F-1 clear.

The results of the separate tests performed on the particularly preferred catalyst of the present invention, catalyst "A", and the control catalyst, catalyst "B", are presented for each test period in Table V in terms of inlet temperature to the reaction in ° F. necessary to achieve the target octane level and the amount of $C_5+$ reformate recovered expressed as vol. % of the charge stock.

TABLE V

| | Results of Accelerated Reforming Test | | | |
|---|---|---|---|---|
| | Catalyst "A" | | Catalyst "B" | |
| Period | T, ° F. | $C_5+$, wt. % | T, ° F. | $C_5+$, wt. % |
| 1 | 995.0 | 71.84 | 1002.0 | 71.37 |
| 2 | 998.5 | 72.16 | 1009.0 | 70.65 |
| 3 | 1000.5 | — | 1014.0 | — |
| 4 | 1004.0 | 71.88 | 1018.5 | 71.90 |
| 5 | 1006.0 | — | 1019.5 | — |
| 6 | 1008.5 | 72.22 | 1020.5 | 71.22 |
| 7 | 1009.5 | — | — | — |
| 8 | 1011.5 | 72.33 | — | — |
| 9 | 1014.0 | — | — | — |
| 10 | 1017.0 | 71.82 | — | — |
| 11 | 1018.0 | — | — | — |
| 12 | 1022.0 | 71.16 | — | — |

Referring now to the results of the comparison test presented in Table V, it is evident that the principal effect of the exclusion of the sulfur component from the platinum-nickel-tin trimetalic catalyst is to substantially promote same and to enable the sulfur-free catalyst to substantially outperform the sulfur-containing catalyst in the areas of activity and activity stability. That is, the data presented in Table V clearly indicates that the acidic, sulfur-free trimetallic catalyst of the present invention is markedly superior to the control catalyst in a high severity reforming process. As was pointed out in detail, hereinbefore, a good measure of activity for a reforming catalyst is the inlet temperature in the reactor which is required to make target octane and the data presented in Table V on this variable clearly shows the catalyst "A" was significantly more active than catalyst 37 B". The activity advantage that catalyst "A" manifests is consistently equal to or better than 7° F. in inlet reactor temperature. A specific example of this activity advantage can be obtained by looking at the data for period 6 of the test (i.e. 144 hours into the test), at this point, catalyst "A" required an inlet temperature of 1008.5 in order to make octane which stands in sharp contrast to the 1020.5 requirement of catalyst "B" at the same point in the run. This 12° F. difference in temperature requirement for octane is impressive evidence of the ability of the catalyst of the present invention to materially accelerate the rate of the involved reforming reaction without materially changing the $C_5+$ yield. Thus, the data clearly shows that the composite of the present invention was more active than the control catalyst. However, activity is only one of the necessary characteristics needed in order for a catalyst to demonstrate superiority. Activity characteristics must be coupled with superior selectivity and stability characteristics in order to demonstrate improved performance. Selectivity is measured directly by $C_5+$ yield and the data presented in Table V clearly indicates that catalyst "A" consistently produced yields equivalent to or better than those for catalyst "B". (It is to be noted that the dashes in Table II represent periods where the relevant analyses of the product streams were not made). On the other hand, good stability characteristics are shown by the rate of change of the activity and selectivity parameters as was explained hereinbefore, and on this basis the incremental change in temperature required to maintain octane and in $C_5+$ yield exhibited in Table V clearly shows excellent stability for the catalyst of the present invention.

EXAMPLE V

In order to demonstrate the unexpectedness of the beneficial effect of nickel on a platinum- and tin or lead-containing acidic catalyst as established in the preceding examples, a bimetallic catalyst was prepared which contained 0.375 wt. % platinum, 0.5 wt. % nickel, and 0.9 wt. % chloride in combination with a gamma-alumina carrier material. This bimetallic catalyst was prepared by a method analogous to that set forth in Example I except for the inclusion of the tin component. A monometallic platinum control catalyst was also prepared via a similar procedure to contain 0.375 wt. % platinum and 0.9 wt. % chloride in combination with a gamma-alumina carrier material.

These catalysts were then subjected to the catalytic reforming test described in Example III and the results of the test are presented in Table VI in the same terms as used in Tables II and III.

TABLE VI

| | RESULTS OF COMPARISON TESTS | | | |
|---|---|---|---|---|
| Period No. | T, ° F. | Separator Gas SCF/bbl | Debutanizer Gas SCF/bbl | Debutanizer /Total Gas Ratio | Octane No. F-1 Clear |
| Monometallic catalyst - 0.375 wt. % platinum and 0.9 wt. % chloride. | | | | | |
| 1 | 973 | 1407 | 82 | .055 | 95.2 |
| 2 | 973 | 1338 | 81 | .057 | 93.6 |
| 3 | 973 | 1308 | 86 | .062 | 93.1 |
| 4 | 1007 | 1431 | 101 | .066 | 96.6 |
| 5 | 1007 | 1358 | 109 | .074 | 95.3 |
| 6 | 1007 | 1282 | 103 | .074 | 94.0 |
| Bimetallic catalyst - 0.5 wt. % nickel, 0.375 wt. % platinum and 0.9 wt. % chloride. | | | | | |
| 1 | 966 | 1575 | 80 | 0.049 | 102.5 |
| 2 | 966 | 1455 | 90 | 0.059 | 100.5 |
| 3 | 965 | 1344 | 91 | 0.063 | 98.6 |
| 4 | 1000 | 1167 | 119 | 0.093 | 96.0 |
| 5 | 999 | 956 | 131 | 0.121 | 89.7 |
| 6 | 997 | 864 | 137 | 0.136 | 86.2 |

By comparing the results for monometallic catalyst with those for bimetallic catalyst, and using the previously explained criteria for activity, selectivity and stability, it is manifest that the aggregate effect of nickel on a platinum-containing monometallic catalyst is extremely unfavorable. In other words, this data clearly shows that nickel is not a promoter for a monometallic platinum-containing catalyst. In sharp contrast with this adverse effect of nickel, it is my finding that nickel does beneficially interact with a platinum-tin or lead bimetallic catalyst.

It is intended to cover by the following claims all changes and modifications of the above disclosure of the present invention that would be self-evident to a man of ordinary skill in the catalyst formulation art as in the hydrocarbon conversion arts.

I claim as my invention:

1. An acidic sulfur-free gasoline reforming catalytic composite comprising a halided porous carrier material containing, on an elemental basis, about 0.01 to about 2 wt. % platinum, about 0.01 to about 5 wt. % nickel, about 0.01 to about 5 wt. % tin or lead and about 0.1 to about 3.5 wt. % halogen, wherein the platinum, nickel, and tin or lead are uniformly dispersed throughout the porous carrier material, wherein substantially all of the platinum is present in the elemental metallic state, wherein substantially all of the tin or lead is present in an oxidation state above that of the elemental metal, and wherein the major portion of the nickel is present in the elemental metallic state.

2. An acidic sulfur-free catalytic composite as defined in claim 1 wherein the halogen is chlorine.

3. An acidic sulfur-free catalytic composite as defined in claim 1 wherein the atomic ratio of nickel to platinum is about 0.2:1 to about 20:1 and wherein the atomic ratio of tin or lead to platinum is about 0.05:1 to about 10:1.

4. An acidic sulfur-free catalytic composite as defined in claim 1 wherein substantially all of the tin or lead is present as tin oxide or lead oxide.

5. An acidic sulfur-free catalytic composite as defined in claim 1 wherein the composite contains, on an elemental basis, about 0.05 to about 1 wt. % platinum, about 0.05 to about 2 wt. % nickel, about 0.05 to about 2 wt. % tin or lead and about 0.5 to about 1.5 wt. % halogen and wherein the porous carrier material is alumina.

6. An acidic sulfur-free catalytic composite as defined in claim 1 wherein substantially all of the nickel contained in the composite is present in the elemental metallic state.

7. An acidic sulfur-free catalytic composite as defined in claim 1 wherein the porous carrier material is a refractory inorganic oxide.

8. An acidic sulfur-free catalytic composite as defined in claim 7 wherein the refractory inorganic oxide is alumina.